United States Patent [19]

Petro

[11] 4,162,152

[45] Jul. 24, 1979

[54] MOLTEN GLASS METERING DEVICE FOR MAKING LAMP BASES

[75] Inventor: James Petro, Little Falls, N.J.

[73] Assignee: Westinghouse Electric Corp., Pittsburgh, Pa.

[21] Appl. No.: 831,723

[22] Filed: Sep. 9, 1977

[51] Int. Cl.² ............................................. C03B 5/26
[52] U.S. Cl. ............................................. 65/164; 65/70; 65/327; 65/334
[58] Field of Search ................. 65/70, 164, 327, 334

[56] References Cited

U.S. PATENT DOCUMENTS

| 549,404 | 11/1895 | Steimer | 65/334 X |
| 2,957,276 | 10/1960 | Spaller | 65/334 X |
| 3,244,495 | 4/1966 | Apple et al. | 65/327 X |
| 3,498,779 | 3/1970 | Hathaway | 65/327 |

FOREIGN PATENT DOCUMENTS 1144846  4/1957  France .......................................... 65/327

Primary Examiner—Arthur D. Kellogg
Attorney, Agent, or Firm—R. S. Lombard

[57] ABSTRACT

A molten glass metering device for making electric lamp bases by accurately metering the rate of flow of molten glass from an orifice in the wall of a glass melting furnace. The device comprises a metal member including an integral hollow elongated member aligned with the orifice. The flow of glass is controlled by varying the flow of electrical current through the metal member to control the temperature of same and to control the temperature of the glass within the metal member, thereby to control the rate of flow of molten glass therethrough.

3 Claims, 6 Drawing Figures

MOLTEN GLASS METERING DEVICE FOR MAKING LAMP BASES

BACKGROUND OF THE INVENTION

For many years, glass melting furnaces generally, and in particular those used for making electric lamp bases, consisted of a hearth for melting and refining the glass and a platinum orifice to permit the flow of glass out of the furnace. The glass flow rate was entirely a function of the diameter and length of the orifice, the glass composition, depth and temperature.

Difficulties with this design have been encountered as far as the inability to rapidly and accurately change the glass flow rate, which could only be changed by changing the temperature of all the glass in the furnace.

SUMMARY OF THE INVENTION

There is provided in combination with an electric lamp base making apparatus a molten glass metering device for rapidly and accurately controlling the viscosity and thus the rate of flow of molten glass from an orifice in a wall of a glass melting furnace which is part of the base making apparatus. The outer portion of the wall has provided therein an annular-shaped slot spaced from and encircling the orifice. The orifice is positioned in the furnace to have a quantity of molten glass positioned thereover to permit gravity flow of a stream of molten glass therethrough. The base making apparatus also includes a glass collecting and shearing mechanism positioned in the path of the glass stream. The mechanism collects the glass of the stream and shears the stream when a predetermined amount of molten glass has been collected. The apparatus further includes mold means comprising a plurality of upwardly opening molds having the shearing mechanism positioned thereover so that at least one of the molds is receptive to being fed a predetermined amount of molten glass by the mechanism.

The metering device comprises a high-temperature-resistant chemically stable electrically conductive metal member. The metal member includes an integral hollow elongated member aligned with the orifice. The hollow elongated member has an inlet end for contact with the outer wall portion of the furnace so that molten glass passing from the furnace will flow through the hollow member. The metal member also includes an integral flange member extending radially outwardly from the inlet end of the hollow member and an integral upturned lip member continuous about the periphery of the flange member. The upturned lip member is sized to fit into the slot in the outer wall portion of the furnace to permit sealing of the lip member in the slot. Cooled electrical contact members, preferably water cooled, are fixed to opposite side portions of the metal member. The contact members are adapted to be connected to a source of electrical energy to pass current through the metal member and self-resistance heat same to a predetermined temperature.

The device also comprises electrical control means for controlling the self resistance heating of the metal member to vary in a rapid and controllable fashion the temperature thereof, thereby controlling the temperature, and thus the viscosity of glass within the metal member to control the rate of glass flow therethrough.

BRIEF DESCRIPTION OF THE DRAWINGS

For a better understanding of the invention, reference may be had to the accompanying drawings in which.

DESCRIPTION OF THE PREFERRED EMBODIMENT

Figure 1:
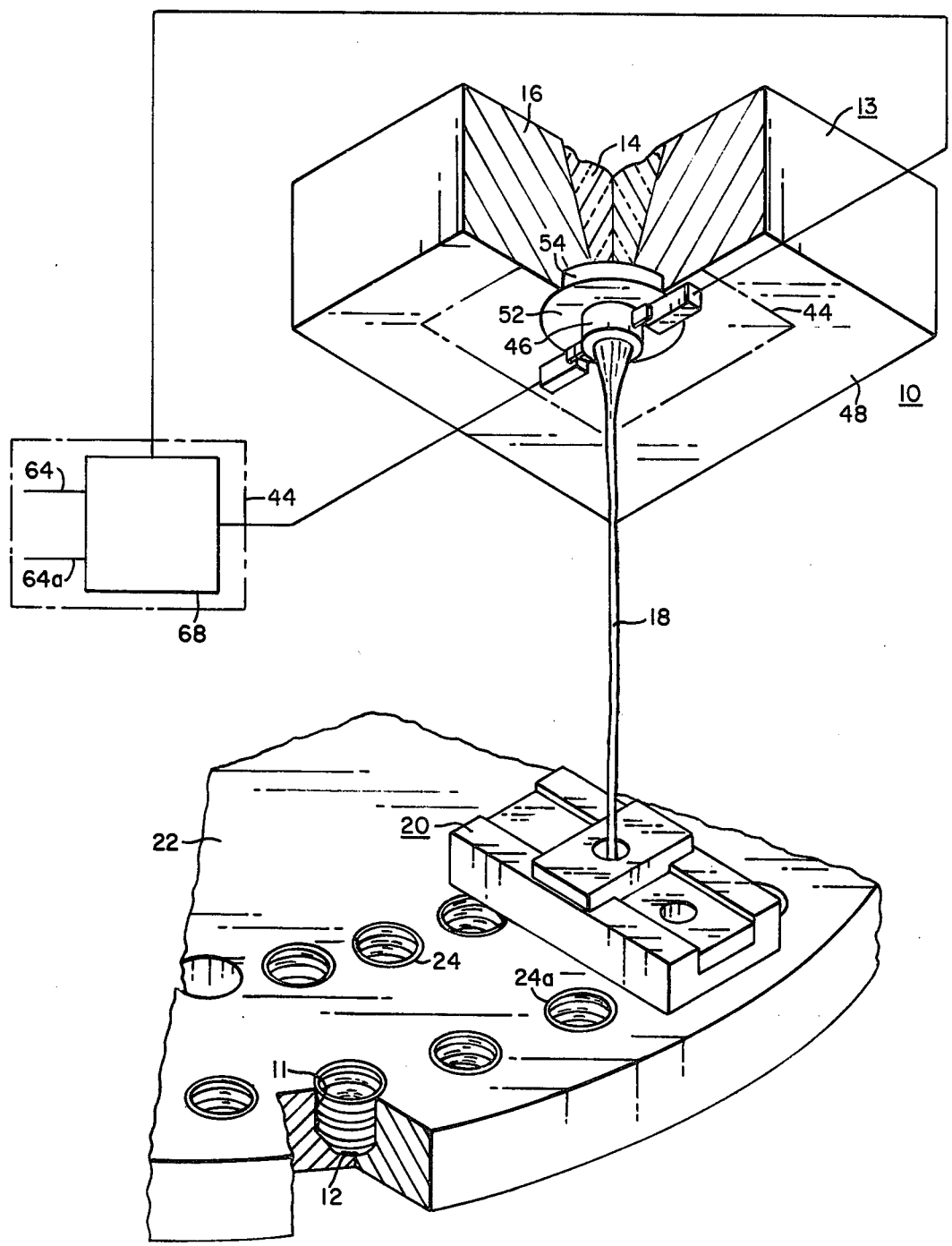
FIG. 1 is a schematic of an electrical lamp base making apparatus.
Figure 2:
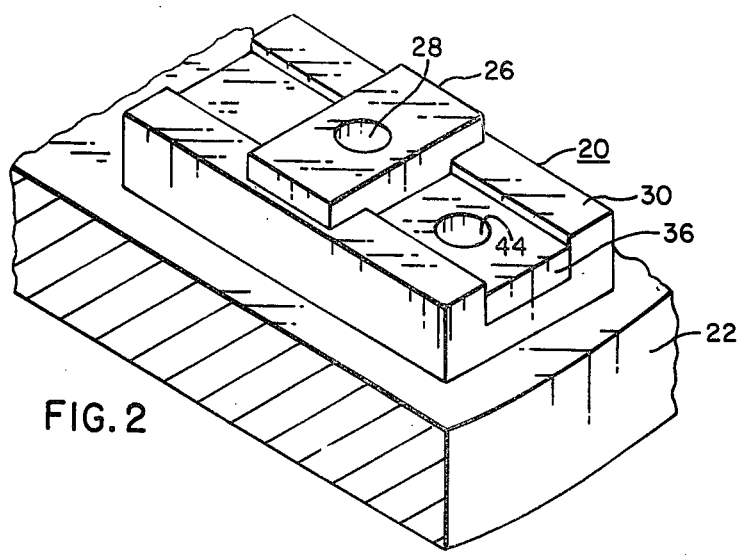
FIG. 2 is an isometric view showing a glass collecting and shearing mechanism.

In FIG. 1 is shown an electrical lamp base making apparatus 10 for making bases of the type including metallic shell 11 and center eyelet contact 12 which are both physically bonded and electrically insulated by a molded piece of glass. The electric lamp base making apparatus 10 includes a glass melting furnace 13 having an orifice 14 so positioned in the wall 16 of the furnace 13 to have a quantity of molten glass positioned thereover to permit gravity flow of a stream 18 of molten glass therethrough. The base making apparatus 10 also includes a glass collecting and shearing mechanism 20 positioned in the path of the glass stream 18 to collect the glass of the stream 18 and to shear the stream 18 when a predetermined amount of molten glass has been collected. The base making apparatus 10 further includes mold means 22 comprising a disc-shaped member 23 having included therein a plurality of pairs of upwardly opening molds 24, 24a arranged on the disc-shaped member 23 so that pairs of molds 24, 24a are co-linearly aligned along the radius of the disc-shaped member 23 and are spaced at regular intervals thereabout. The shearing mechanism 20 is positioned over the mold means 22 so that at least one of the molds is receptive to being fed a predetermined amount of molten glass upon the completion of an index of the mold means 22.

In FIGS. 2–5 is shown a typical glass-collecting and shearing mechanism 20 positioned in relationship to the mold means 22. The shearing mechanism 20 has a top member 26 having a first cylindrical perforation 28 extending therethrough and aligned with the orifice 14. Beneath the top member 26 and in supportive relationship therewith is a bottom member 30 having second and third cylindrical perforations 32, 34 both extending therethrough and being positioned so that each is simultaneously aligned with molds 24, 24a. Between the top member 26 and the bottom member 30 is positioned a slideable member 36 having fourth and fifth cylindrical perforations 42, 44 extending therethrough and having their axes spaced a distance equal to one-half the distance between the axes of the second and third cylindrical perforations 32, 34.

Figure 3:
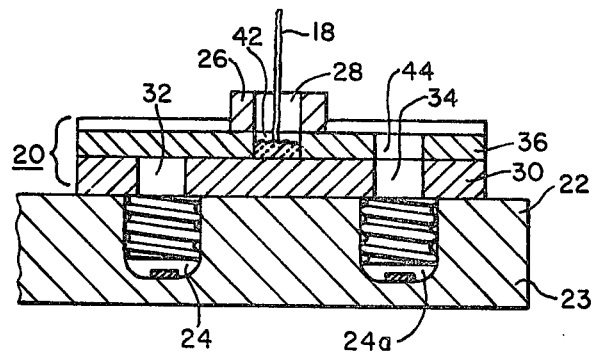
FIGS. 3–5 are elevational views partly broken away of a glass collecting and shearing mechanism, showing a sequence of operations.
Figure 4:
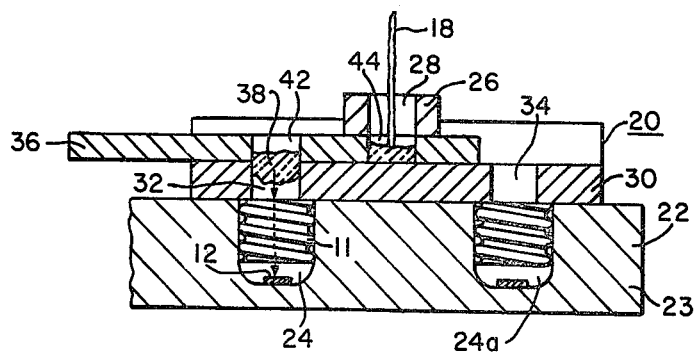
Figure 5:
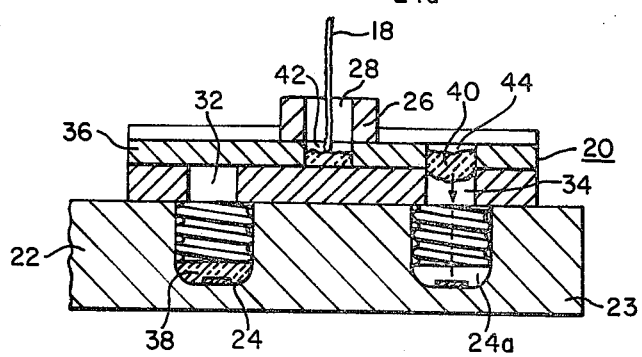

The operation of the shearing mechanism 20 can be explained by referring to FIGS. 3–5. The glass stream 18 enters the first perforation 28 and passes through into the fourth perforation 42 as shown in FIG. 3. When the slideable member 36 moves inwardly towards the center of the disc-shaped member 23, the glass stream is sheared off and a first glass gob 38 is formed as shown in FIG. 4. When the first gob 38 is moved by the slideable member 23 to a position over the second perforation 32, the first gob 38 falls through to the mold 24 containing shell 11 and center eyelet 12. Simultaneously the fifth perforation 44 is aligned with the first perforation 28 and the stream 18 passes into the fifth perforation 44. When the slideable member 36 moves outwardly away from the center of the disc-shaped member 23, the glass stream is sheared off and a second glass gob 40 is formed. When the second gob 40 is moved by the slideable member 23 to a position over the third perforation 34, the gob 40 falls through to the mold 24a as shown in FIG. 5. The operation as described is continuously repeated as the mold means is indexed as is well known in the art, see U.S. Pat. No. 2,957,276, issued to Robert L. Spaller, dated Oct. 25, 1960. Electrical base making apparatus 10 as described hereinbefore is generally conventional.

In a typical production glass-melting furnace, glass flow rate is normally controlled by changing glass temperature. Factory operation is best accomplished by maintaining nearly constant glass level. The glass flow rate of the prior art production furnace is given by "Fanning's equation" which states essentially that for a given orifice, flow varies as the square root of glass depth and the fourth power of the absolute temperature. Therefore, slight temperature changes vary flow rate greatly. In actual production, there is often experienced a time lag when changing operating conditions resulting in over-shooting or under-shooting the desired temperature at the orifice, or worse, a day-long hunting up and down trying to establish some new operating conditions.

Figure 6:
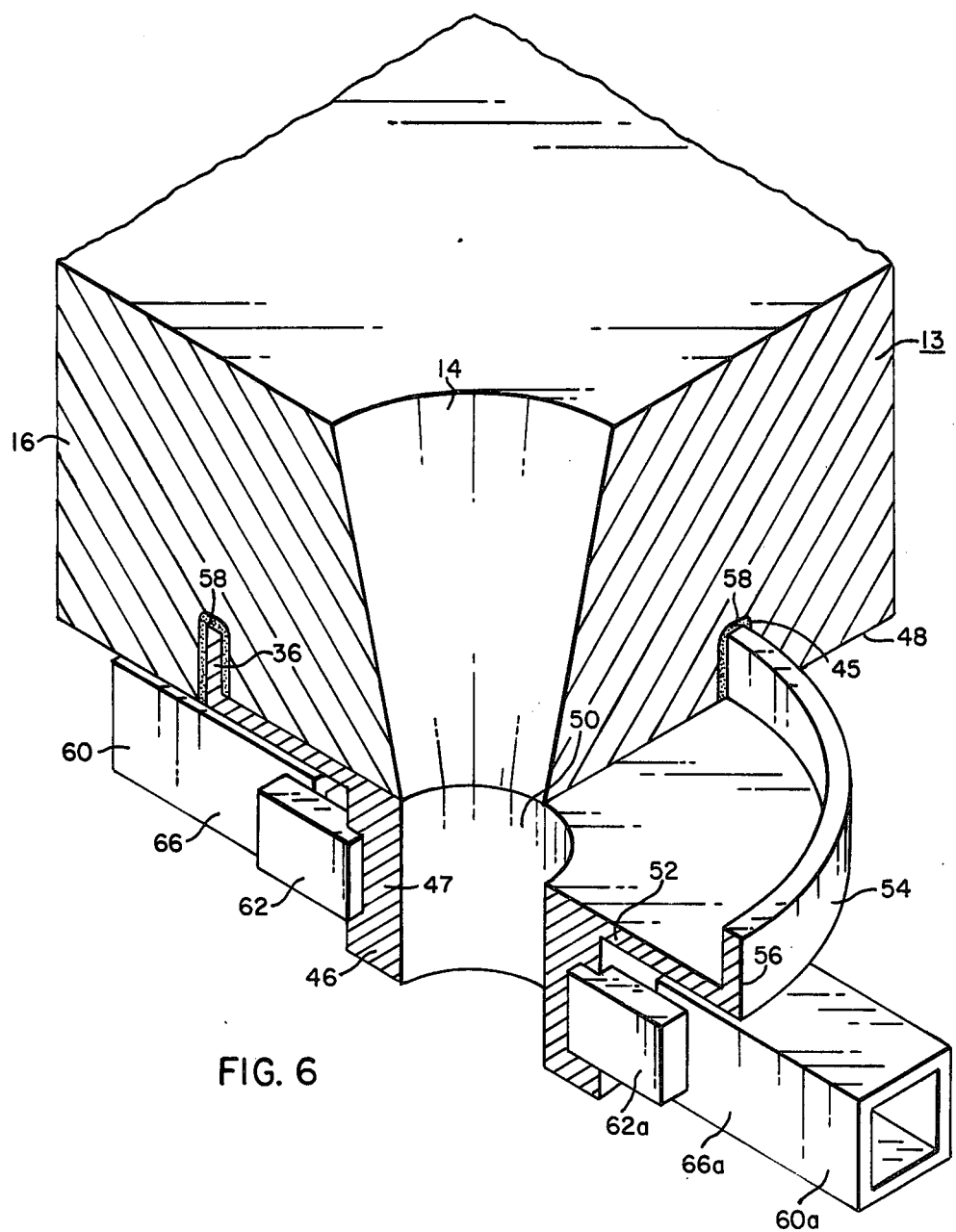
FIG. 6 is an isometric view partly broken away of the metering device partially embedded in the wall of the furnace.

Referring to FIGS. 1 and 6, the improvement comprises molten glass metering device 44 for rapidly and accurately controlling the viscosity and thus the rate of flow of molten glass from the orifice 14 in the wall 16 of a glass melting furnace 13. The outer portion 48 of the wall 16 has provided therein an annular-shaped slot 45 spaced from and encircling the orifice 14.

The device 44 comprises a high-temperature-resistant chemically stable electrically conductive metal member 46 including an integral hollow elongated member 47 aligned with the orifice 14. The hollow member 47 has an inlet end 50 for contact with the outer wall portion 48 of the furnace 13 so that all molten glass passing from the furnace 13 will flow through the hollow member 47. The metal member 46 also including an integral flange member 52 extending radially outwardly from the inlet end 50 of the hollow member 47, and an integral upturned lip member 54 continuous about the periphery of the flange member 52. The upturned lip member 54 is sized to fit into the slot 45 in the outer wall portion 48 of the furnace 13 to permit sealing of the lip member 54 in the slot 45. The lip member 54 may be sealed in the slot by a refractory cement joint 58. The invention as shown prevents the cement from being in contact with the highly corrosive molten glass, therefore, requiring far less "down time" for replacement of the cement than that of the usual prior art in which the cement was in contact with the molten glass. The metal member as shown is preferably composed of platinum in order to withstand the corrosiveness of the molten glass.

The device 44 also comprises cooled electrical contact members 60, 60a, preferably water-cooled, affixed to opposite side portions 62, 62a of the metal member 46. The contact members 60, 60a are adapted to be connected to a source of electrical energy 64, 64a to pass a current through the metal member 46 to self-resistance heat same to a predetermined temperature. Each of the water-cooled electrical contact members 60, 60a comprises a water-cooled copper bus bar 66, 66a.

The device 44 further comprises electrical control means 68 for controlling the self-resistance heating of the metal member 46 to vary in a rapid and controllable fashion the temperature thereof, thereby to control the temperature, and thus the viscosity of glass within the metal member 46 to control the rate of glass flow therethrough. The control means 68 may be a conventional current control device operating in conjunction with a 2,000 ampere 4 KVA transformer to produce low voltage electricity ($\frac{1}{2}$ volt) at 1,000 amperes (500 watts) which enters the metallic member 46 through the contact members 60, 60a. The resistance of the metallic member 46 is such that it heats to about 1,200° C. and by varying the control means 68, the desired temperature can be dialed in. Thus the present invention permits the rate of flow of glass through the orifice 12 to be dependent entirely on the electric power input to the member 46, which is controlled by the control means 68. During operation of the device 44, a thermal balance exists with the cooling action by conduction of heat from the metal member 46 to the water-cooled electrical contact members 60, 60a, the radiation to the surrounding area, and the convection air currents being off-set by the heating action generated by electrical resistance heating. Molten glass of a given temperature in the furnace 13, such as conventional soda-lime silicate glass which may be tinted, if desired, passes through the metal member 46 with resulting heating, cooling, or undiminished heat loss. When extra heat is supplied by the member 46, glass flow is increased, but when the thermal balance drains heat from the molten glass, the flow is decreased. By turning the source of electrical energy off, flow becomes zero in minutes. This invention permits the furnace 13 to remain "ON" for an extended period of time ready for instant start-up. To start glass flow, all that is necessary is that the electrical energy source 66 be turned "ON". The control means 68 may be left at the same setting. While water cooling of the electrical contact members 60, 60a is preferred, other types of cooling such as other liquids or even air flow cooling can be substituted therefor.

I claim:

1. A molten glass metering device for rapidly and accurately controlling the viscosity and thus the rate of flow of molten glass from an orifice in a wall of a glass melting furnace, the outer portion of said wall having provided therein an annular-shaped slot spaced from and encircling said orifice, said orifice positioned in said furnace to have a quantity of molten glass positioned thereover to permit gravity flow of a stream of molten glass therethrough, said device comprising:

(a) a high-temperature-resistant chemically stable electrically conductive metal member including an integral hollow elongated member aligned with said orifice, said hollow elongated member having an inlet end for contact with said outer wall portion of said furnace so that molten glass passing from said furnace will flow through said hollow member, said metal member also including an integral flange member extending radially outwardly from said inlet end of said hollow member and an integral upturned lip member continuous about the periphery of said flange member, said upturned lip member sized to fit into said slot in said outer wall portion of said furnace to permit sealing of said lip member in said slot;

(b) water-cooled electrical contact members affixed to opposite side portions of said metal member, and said contact members adapted to be connected to a source of electrical energy to pass current through said metal member and self-resistance heat same to a predetermined temperature; and (c) electrical control means for controlling the self-resistance heating of said metal member to vary in a rapid and controllable fashion the temperature thereof thereby to control the temperature and thus the viscosity of glass within said orifice to control the rate of glass flow therethrough.

2. The device of claim 1, wherein said metal member is composed of platinum.

3. The device of claim 1, wherein each of said water cooled electrical contact members comprise a water-cooled copper bus bar.

* * * * *